(12) United States Patent
Zhang et al.

(10) Patent No.: US 11,581,110 B2
(45) Date of Patent: Feb. 14, 2023

(54) CABLE ASSEMBLY AND MANUFACTURING METHOD THEREOF

(71) Applicant: Lanto Electronic Limited, Kunshan (CN)

(72) Inventors: XianSheng Zhang, Kunshan (CN); Yi Zhou, Kunshan (CN); WeiChuang Kong, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 0 days.

(21) Appl. No.: 17/497,531

(22) Filed: Oct. 8, 2021

(65) Prior Publication Data
US 2022/0328214 A1  Oct. 13, 2022

(30) Foreign Application Priority Data

Apr. 7, 2021 (CN) .......................... 202110372948.X (51) Int. Cl.
| | | |
|---|---|---|
| H01B 7/17 | (2006.01) | |
| H01B 13/14 | (2006.01) | |
| H01B 7/02 | (2006.01) | |
| H01B 13/24 | (2006.01) | |

(52) U.S. Cl.
CPC ........... *H01B 13/14* (2013.01); *H01B 7/0225* (2013.01); *H01B 7/17* (2013.01); *H01B 13/245* (2013.01)

(58) Field of Classification Search
CPC ........ H01B 7/0225; H01B 7/17; H01B 7/183; H01B 7/225; H01B 7/228; H01B 9/021; H01B 9/023; H01B 9/024; H01B 13/14; H01B 13/245; H01B 31/06

USPC ...................... 174/74 R, 78, 84 R, 840, 88 R
See application file for complete search history.

(56) References Cited

U.S. PATENT DOCUMENTS

| | | | |
|---|---|---|---|
| 2013/0126210 A1 | 5/2013 | Kehl | |
| 2013/0202259 A1 | 8/2013 | Varkey et al. | |
| 2014/0141637 A1* | 5/2014 | Miyakawa | ........... H01R 13/639 439/246 |

(Continued)

FOREIGN PATENT DOCUMENTS

| | | |
|---|---|---|
| CN | 104752352 A | 7/2015 |
| CN | 108782821 A | 5/2017 |
| CN | 107863190 A | 3/2018 |

(Continued)

*Primary Examiner* — William H. Mayo, III
(74) *Attorney, Agent, or Firm* — Birch, Stewart, Kolasch & Birch, LLP (57) ABSTRACT

A cable having a transmission wire, a first metal covering layer, an inner insulating layer, a second metal covering layer, an outer insulating layer, an insulating protective layer, and an outer metal layer and method of making such. The transmission wire, a first metal covering layer, and inner insulating layer extend along a first direction, wherein the first metal covering layer and inner insulating layer cover the transmission wire. The first metal covering layer comprises a first axial end part. The inner insulating layer comprises a second axial end part. The second metal covering layer extends along the first direction and covers the inner insulating layer. The second metal covering layer comprises a third axial end part. The outer insulating layer extends along the first direction and covers the second metal covering layer. The outer insulating layer comprises a fourth axial end part.

20 Claims, 11 Drawing Sheets

(56) References Cited

U.S. PATENT DOCUMENTS

2018/0069327 A1\* 3/2018 Nakata .................. H01R 13/03

FOREIGN PATENT DOCUMENTS

| CN | 209388751 U | 9/2019 |
|----|-------------|--------|
| CN | 112002469 A | 11/2020 |

\* cited by examiner

CABLE ASSEMBLY AND MANUFACTURING METHOD THEREOF

CROSS-REFERENCE TO RELATED APPLICATION

This application claims the priority benefit of Chinese Patent Application Serial Number 202110372948.X, filed on Apr. 7, 2021, the full disclosure of which is incorporated herein by reference.

BACKGROUND

Technical Field

The present disclosure relates to the technical field of cable manufacturing, particularly to a cable assembly and cable manufacturing method in which an outer metal layer is electrically connected to a shielding metal layer of cable for grounding and to avoid forming electrical connections with other metal layers to maintain electromagnetic compatibility.

Related Art

When conventional electronic products are operating, it is normally desired to avoid the influence of external electromagnetic waves on electronic products. During signal transmission, particularly transmitting high-frequency signals, the cable generates electromagnetic waves that are easy to affect the electronic products installed nearby. Thus, electronic products must be equipped with anti-electromagnetic interference devices, and cables must also be equipped with components that lower or reduce electromagnetic radiation therefrom.

Conventional cables fold the metal layer covering a plurality of wires outwards to form a component covering an insulating outer sleeve. The folded metal layer forms a grounding configuration for electromagnetic compatibility. With the increasing requirements for electromagnetic compatibility, conventional cables are provided with components having a plurality of metal layers. When one of the metal layers is folded in order to form a component having electromagnetic compatibility, the folded metal layer can be easy to contact with other metal layers to cause short circuit, which affects the electromagnetic compatibility.

SUMMARY

The embodiments of the present disclosure provide a cable assembly and a manufacturing method thereof tended to solve the problem of short circuit caused by contacting with other metal layers when metal layers of conventional cables are folded outward.

The present disclosure provides a cable assembly, comprising a transmission wire, a first metal covering layer, an inner insulating layer, a second metal covering layer, an outer insulating layer, an insulating protective layer, and an outer metal layer. The transmission wire extends along a first direction. The first metal covering layer extends along the first direction and covers the transmission wire. The first metal covering layer comprises a first axial end part. The inner insulating layer extends along the first direction and coves the first metal covering layer. The inner insulating layer comprises a second axial end part. The second metal covering layer extends along the first direction and covers the inner insulating layer. The second metal covering layer comprises a third axial end part. The outer insulating layer extends along the first direction and covers the second metal covering layer. The outer insulating layer comprises a fourth axial end part. The insulating protective layer covers the third axial end part of the second metal covering layer. The outer metal layer extends radially from the first axial end part of the first metal covering layer to cover the insulating protective layer.

The present disclosure provides a cable manufacturing method, comprising: providing a wire, the wire comprising a transmission wire extending along a first direction, a first metal covering layer extending along the first direction and covering the transmission wire, an inner insulating layer extending along the first direction and covering the first metal covering layer, a second metal covering layer extending along the first direction and covering the inner insulating layer, and an outer insulating layer extending along the first direction and covering the second metal covering layer, the wire comprising an axial end edge; cutting off the outer insulating layer and the second metal covering layer at a first position at a first distance from the axial end edge, peeling off the cut-off outer insulating layer and the second metal covering layer; disposing an insulating protective layer at an axial end part of the cut-off position of the first position of the second metal covering layer, covering the axial end part of the second metal covering layer with the insulating protective layer; forming an outer metal layer, the outer metal layer extending radially from the first metal covering layer to covering the insulating protective layer.

In the embodiments of the present disclosure, by providing an insulating protective layer at the axial end part at the cut-off of the first position of the second metal covering layer, the insulating protective layer would prevent the outer metal layer from being contacting with the second metal covering layer when the outer metal layer extends radially from the first metal covering layer. Thus, the outer metal layer and the second metal covering layer can be prevented from forming a short circuit, which affects the electromagnetic compatibility of the cable.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The FIGURES are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
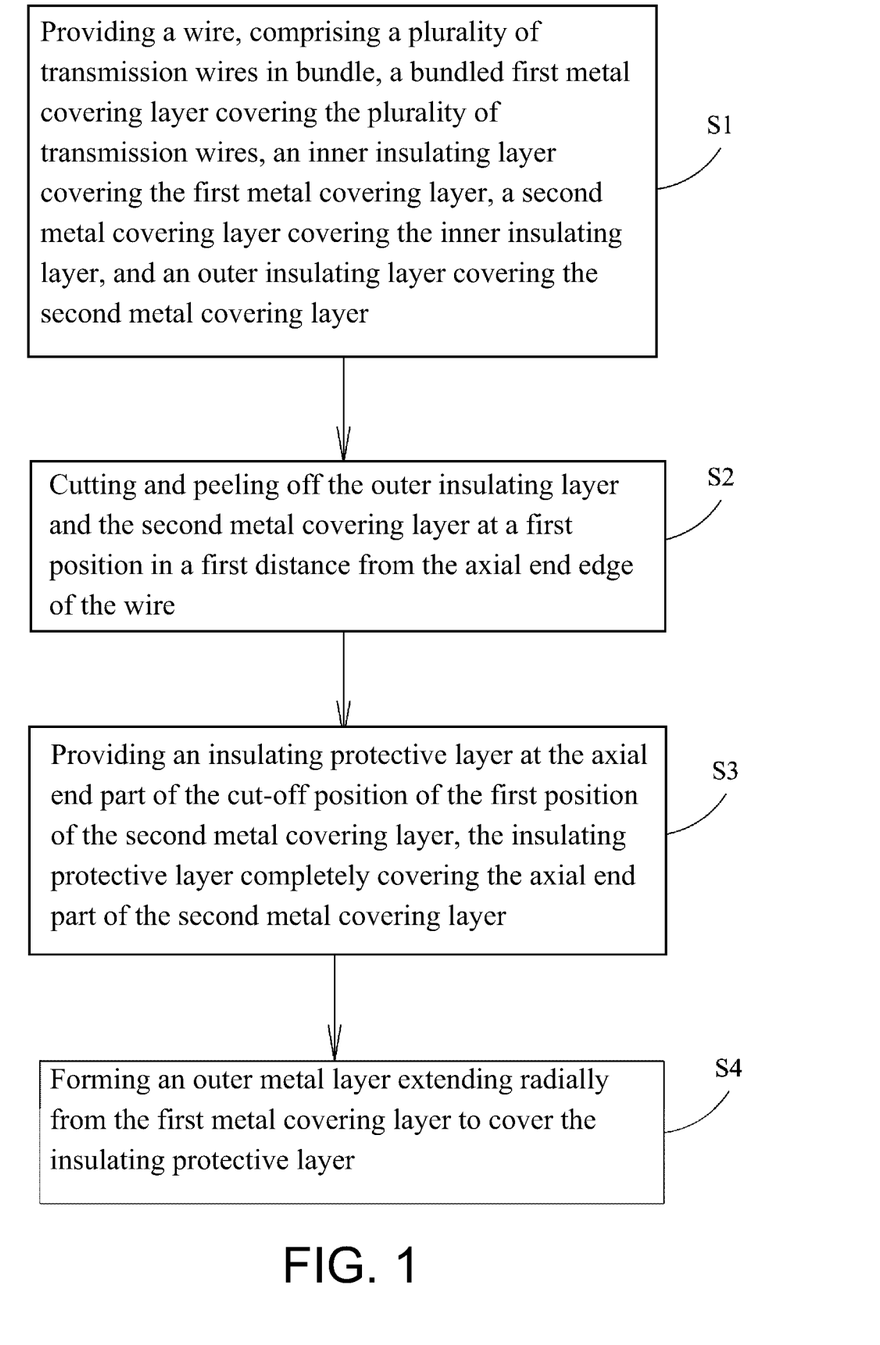
FIG. 1 is a flow chart of a cable manufacturing method of the first embodiment of the present disclosure.
Figure 2:
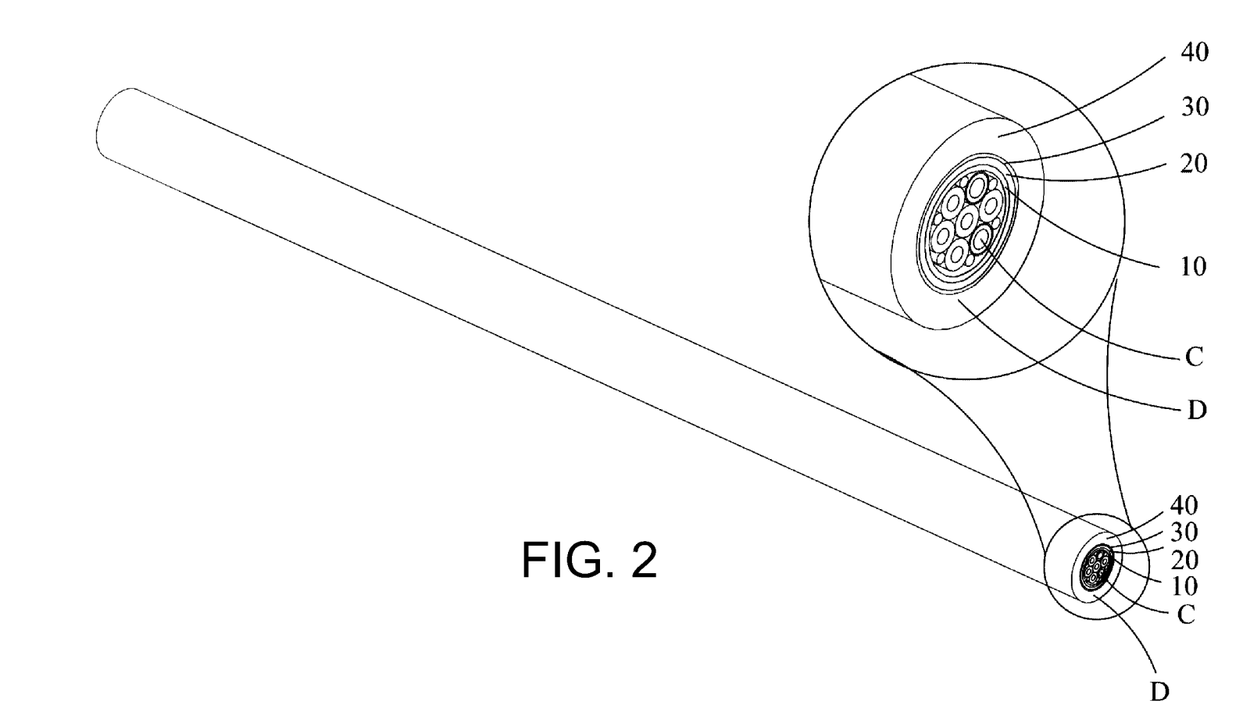
FIG. 2 is a schematic diagram of a cable and a cross-sectional area of the cable provided by a cable manufacturing method of the first embodiment of the present disclosure.

FIG. 1 is a flow chart of a cable manufacturing method of the first embodiment of the present disclosure. FIG. 2 is a schematic diagram of a cable and a cross-sectional area of the cable provided by a cable manufacturing method of the first embodiment of the present disclosure. As shown in the figures, in step S1, a wire is provided, comprising a plurality of transmission wires C extending along a first direction L1, a first metal covering layer 10 extending along the first direction L1 and covering the plurality of transmission wires C, an inner insulating layer 20 extending along the first direction L1 and covering the first metal covering layer 10, a second metal covering layer 30 extending along the first direction L1 and covering the inner insulating layer 20, and an outer insulating layer 40 extending along the first direction L1 and covering the second metal covering layer 30. The wire comprises an axial end edge D. Then the procedure goes to step S2. In some embodiments, the wire could comprise only one transmission wire C. The first metal covering layer 10 extends along the first direction L1 and covers the transmission wire C.

Figure 3:
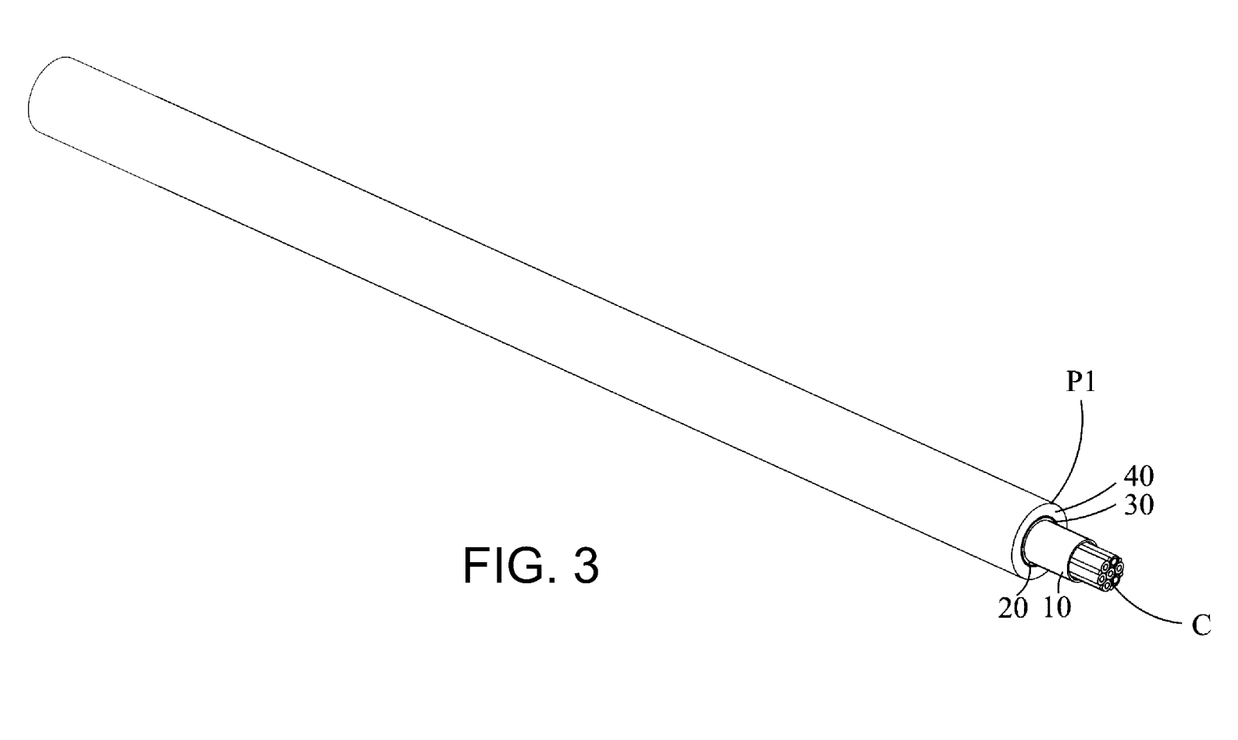
FIG. 3 is a schematic diagram of cutting an outer insulating layer and a second metal covering layer at a first position of the cable provided by the cable manufacturing method of the first embodiment of the present disclosure.

FIG. 3 is a schematic diagram of cutting an outer insulating layer and a second metal covering layer at a first position of the cable provided by the cable manufacturing method of the first embodiment of the present disclosure. Referring to FIG. 1, step S2 performs cutting off the outer insulating layer 40 and the second metal covering layer 30 at a first position P1 at a first distance from the axial end edge D and peeling off the cut-off outer insulating layer 40 and the second metal covering layer 30. When the outer insulating layer 40 and the second metal covering layer 30 are cut off, the inner insulating layer 20 is also cut off at the first position P1 and then peeled off The first metal covering layer 10 covers a plurality of transmission wires C and protrudes from the cross sectional area of the inner insulating layer 20, the outer insulating layer 40, and the second metal covering layer 30. Then the procedure goes to step S3.

Figure 4:
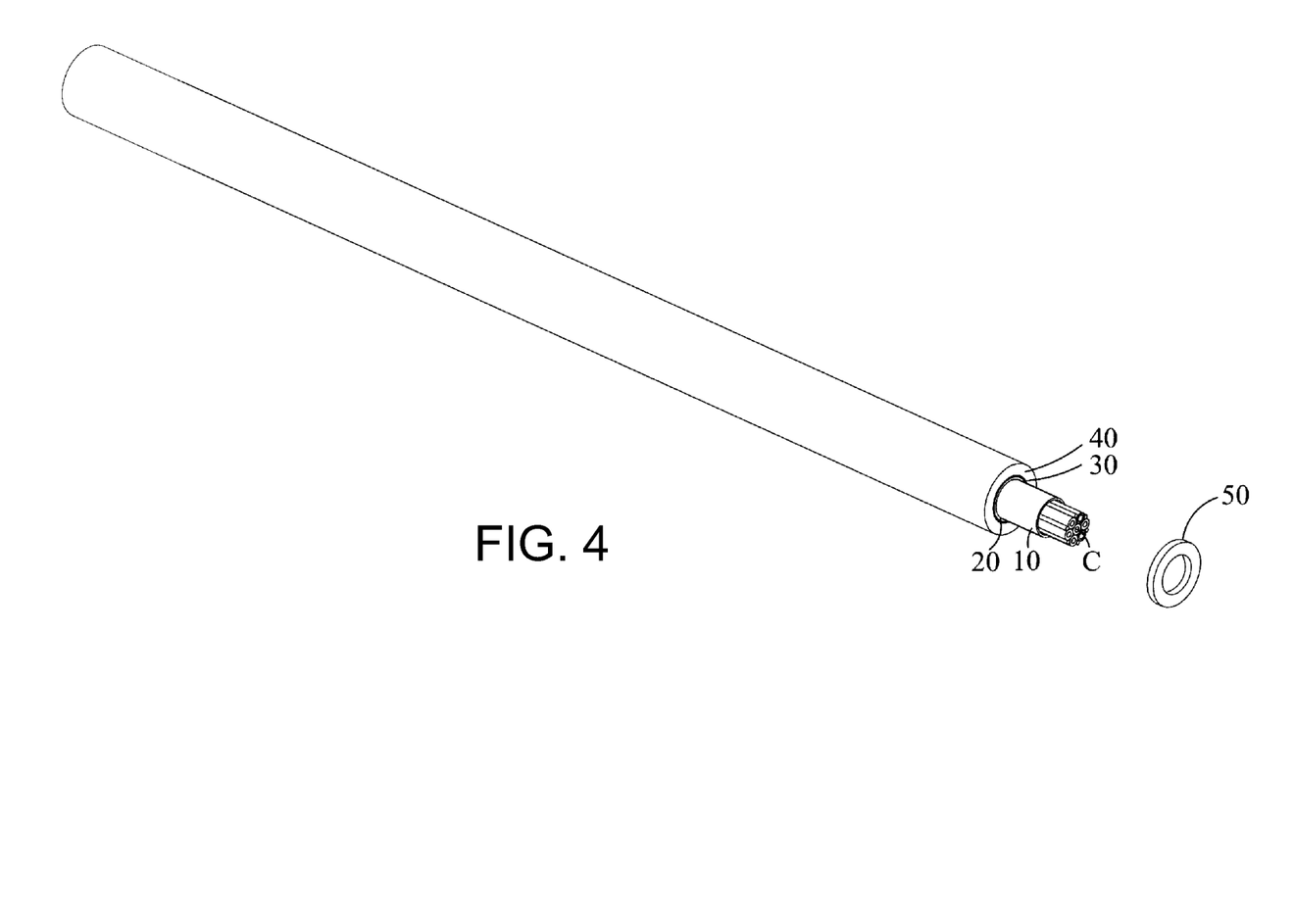
FIG. 4 is a schematic diagram of an insulating protective layer provided by the cable manufacturing method of the first embodiment of the present disclosure.

FIG. 4 is a schematic diagram of an insulating protective layer provided by the cable manufacturing method of the first embodiment of the present disclosure.

Figure 5:
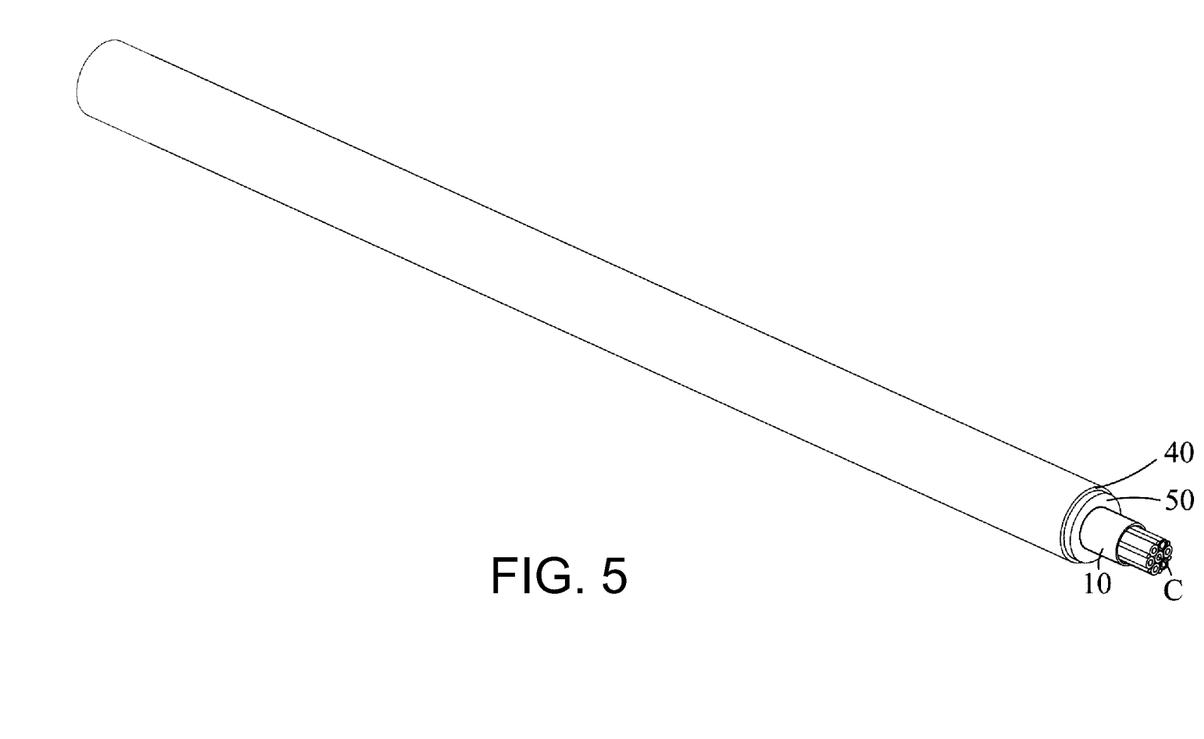
FIG. 5 is a schematic diagram of an insulating protective layer provided at the cut-off position of the first position of the second metal covering layer of the cable provided by the cable manufacturing method of the first embodiment of the present disclosure.

FIG. 5 is a schematic diagram of an insulating protective layer provided at the cut-off position of the first position of the second metal covering layer of the cable provided by the cable manufacturing method of the first embodiment of the present disclosure. Referring to FIG. 1, the step S3 performs disposing an insulating protective layer 50 at an axial end part of the cut-off position of the first position P1 of the second metal covering layer 30 and covering the axial end part of the second metal covering layer 30 with the insulating protective layer 50. In this embodiment, the insulating protective layer 50 is annular, through which the first metal covering layer 10 and the plurality of transmission wires C are passing. The insulating protective layer 50 covers the axial end part of the second metal covering layer 30. In this embodiment, the insulating protective layer 50 is formed on the axial end part of the second metal covering layer 30 by coating or glue dispensing. Besides, the radius of the insulating protective layer 50 could be appropriately configured to cover the axial end part of the inner insulating layer 20 and the axial end part of the outer insulating layer 40. The insulating protective layer 50 can be made of a material that performs electrical insulating, which is not limited thereto. Then the procedure goes to step S4.

Figure 6:
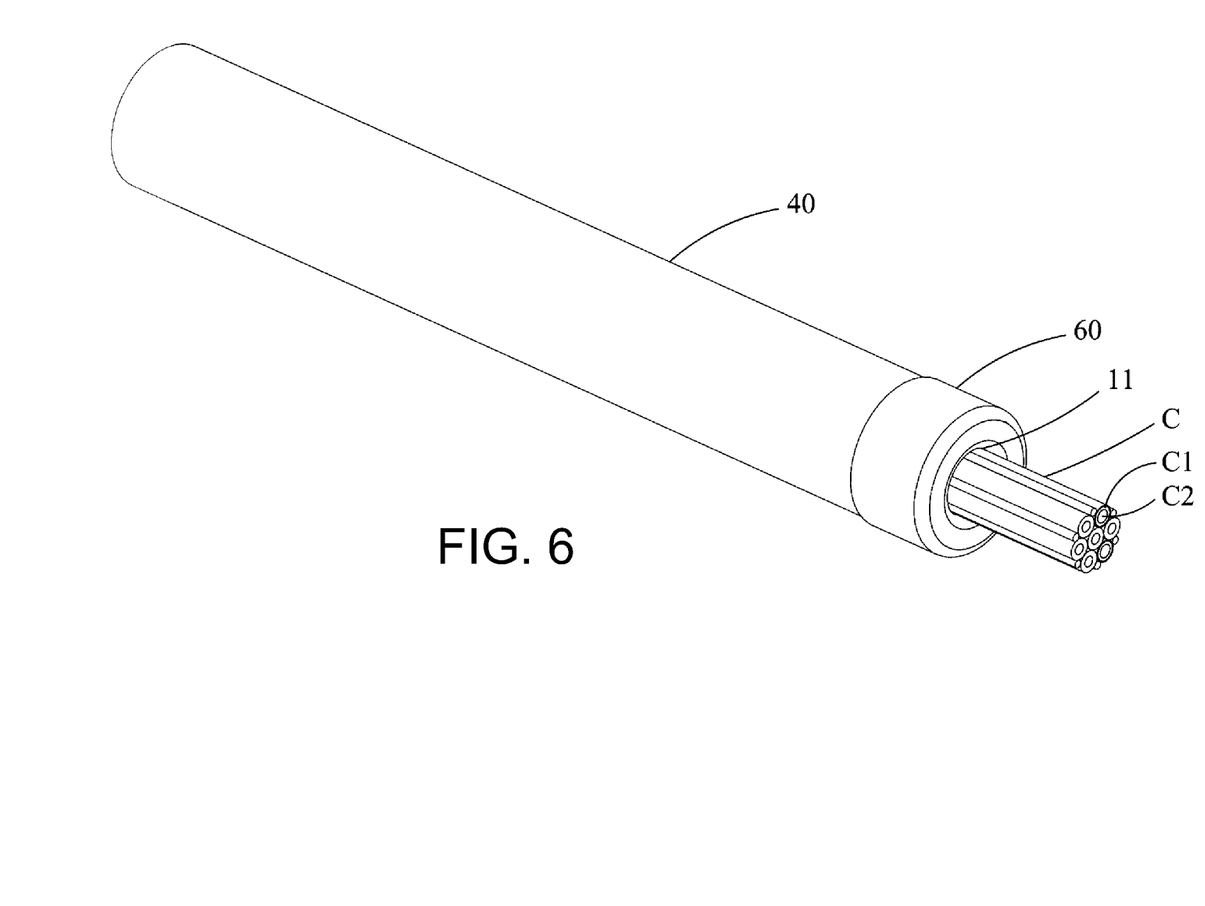
FIG. 6 is a schematic diagram of the first metal layer being back folded to form an outer metal layer in the cable manufacturing method of the first embodiment of the present disclosure.

FIG. 6 is a schematic diagram of the first metal layer being back folded to form an outer metal layer in the cable manufacturing method of the first embodiment of the present disclosure. Referring to FIG. 1, step S4 forms an outer metal layer 60, which extends radially from the first metal covering layer 10 to cover the insulating protective layer 50. In this embodiment, the outer metal layer 60 is formed by folding the first metal covering layer 10 in a radial direction and then in the first direction L1. For example, the first metal covering layer 10 could be pressed and folded along the first direction L1 by the corresponding pressing ring to form the outer metal layer 60.

Figure 7:
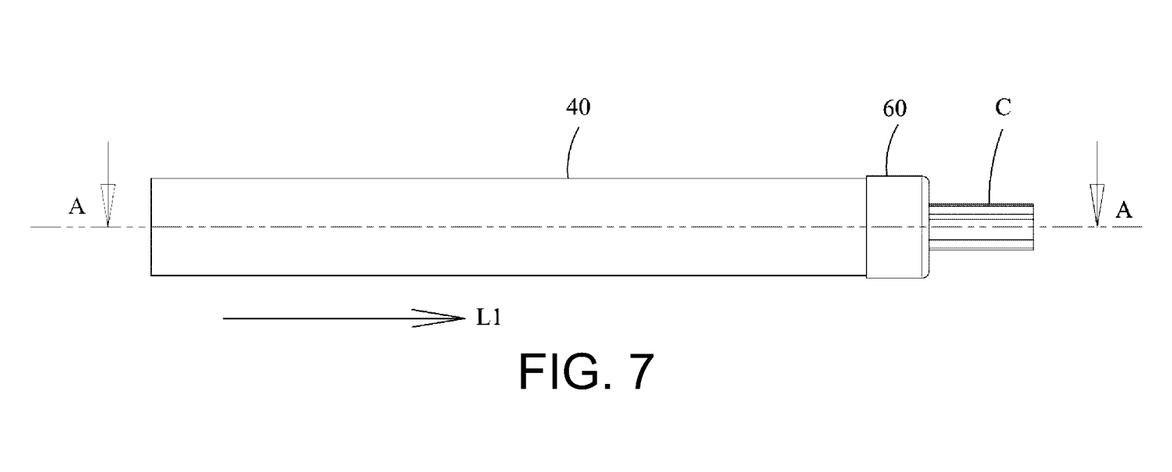
FIG. 7 is a side view of a cable assembly manufactured by the cable manufacturing method of shown in FIG. 2 to FIG. 6.
Figure 8:
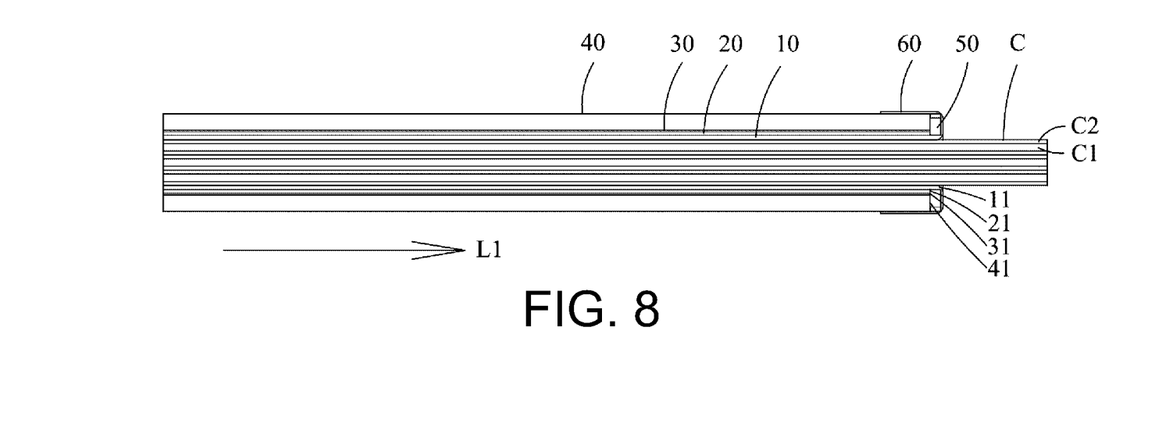
FIG. 8 is a cross-sectional view along line A-A of the cable assembly of FIG. 7.

FIG. 7 is a side view of a cable assembly manufactured by the cable manufacturing method of shown in FIG. 2 to FIG. 6. FIG. 8 is a cross-sectional view along line A-A of the cable assembly of FIG. 7. In one embodiment, the cable assembly comprises a transmission wire C, a first metal covering layer 10, an inner insulating layer 20, a second metal covering layer 30, an outer insulating layer 40, an insulating protective layer 50, and an outer metal layer 60. The plurality of transmission wires C extend along the first direction L1. The first metal covering layer 10 extends along the first direction L1 and covers the transmission wire C, and the first metal covering layer 10 comprises a first axial end part 11. The inner insulating layer 20 extends along the first direction L1 and covers the first metal covering layer 10. The inner insulating layer 20 comprises a second axial end part 21. The second metal covering layer 30 extends along the first direction L1 and covers the inner insulating layer 20. The second metal covering layer 30 comprises a third axial end part 31. The outer insulating layer 40 extends along the first direction L1 and covers the second metal covering layer 30. The outer insulating layer 40 comprises a fourth axial end part 41. The insulating protective layer 50 covers at least the third axial end part 31 of the second metal covering layer 30.

As shown in FIG. 8, the insulating protective layer 50 further covers the second axial end part 21 of the inner insulating layer 20 and the fourth axial end part 41 of the outer insulating layer 40. As mentioned above, the outer insulating layer 40, the second metal covering layer 30, and the inner insulating layer 20 are cut off at the first position P1 having the first distance from the axial end edge D, allowing the second axial end part 21 of the inner insulating layer 20, the third axial end part 31 of the second metal covering layer 30, and the fourth axial end part 41 of the outer insulating layer 40 are aligned and flushed in the first direction. The first metal covering layer 10 is exposed from the inner insulating layer 20, the second metal covering layer 30, and the outer insulating layer 40. The first axial end part 11 of the first metal covering layer 10 is distant from the second axial end part 21, the third axial end part 31, and the fourth axial end part 41. In this embodiment, the outer metal layer 60 and the first metal covering layer 10 are integrally formed. The outer metal layer 60 is formed by folding the first metal covering layer 10 from the first axial end part 11 in the radial direction. By folding the first metal covering layer 10 backward, the outer metal layer 60 extends radially from the first axial end part 11 of the first metal covering layer 10 to cover the insulating protective layer 50. The outer metal layer 60 further extends along the first direction L1 to cover at least a part of the outer insulating layer 40 close to the fourth axial end part 41 to be clamped on an outer surface of the outer insulating layer 40. The bundle of the plurality of transmission wires C is exposed at the back-folded outer metal layer 60. Each of the transmission wires C comprises a conductor core wire C1 and an insulating covering layer C2 covering the conductor core wire C1.

Figure 9:
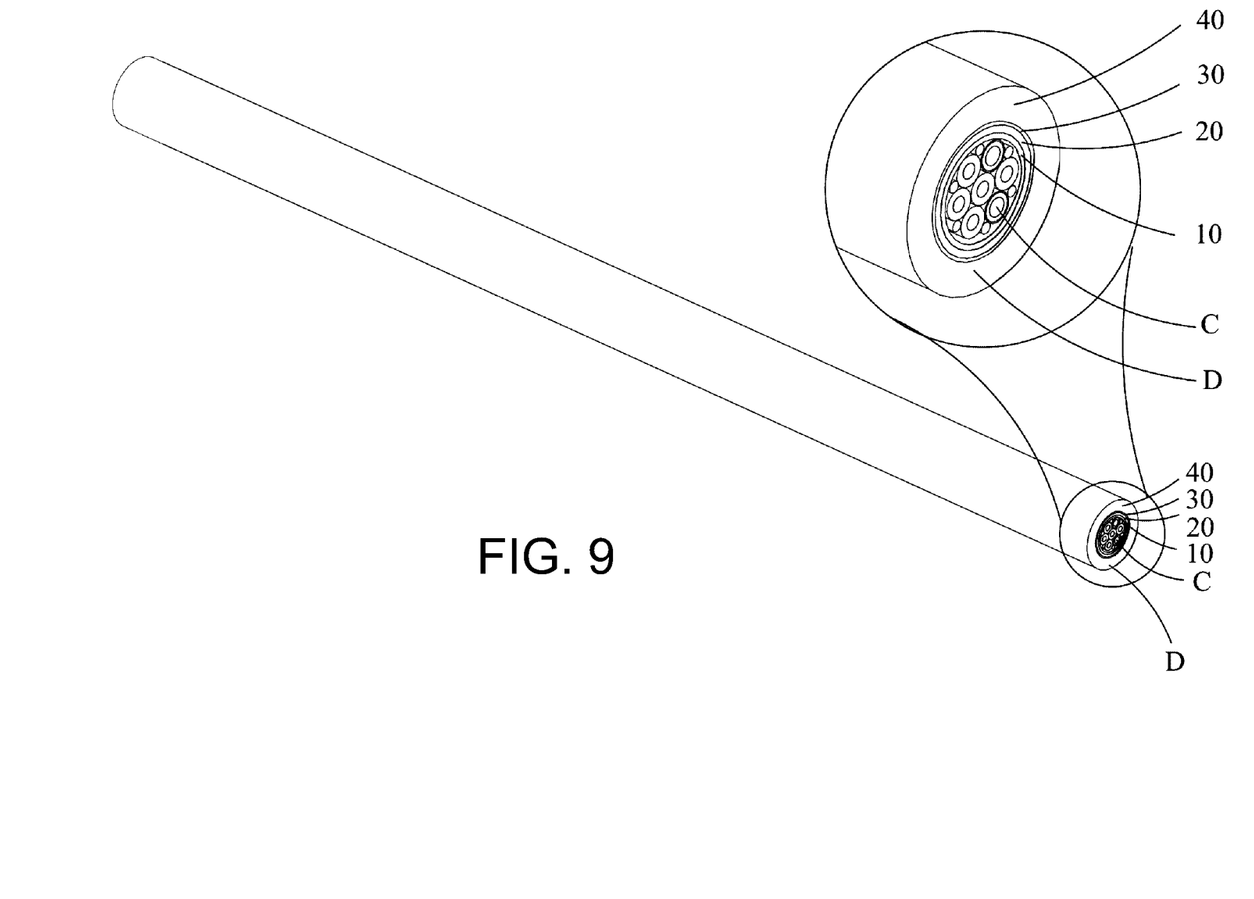
FIG. 9 is a schematic diagram of a cable and a cross-sectional area of the cable provided by a cable manufacturing method of the second embodiment of the present disclosure.

FIG. 9 is a schematic diagram of a cable and a cross-sectional area of the cable provided by a cable manufacturing method of the second embodiment of the present disclosure. Referring to FIG. 1, in step S1, a wire is provided, comprising a plurality of transmission wires C extending along a first direction L1, a first metal covering layer 10 extending along the first direction L1 and covering the plurality of transmission wires C, an inner insulating layer 20 extending along the first direction L1 and covering the first metal covering layer 10, a second metal covering layer 30 extending along the first direction L1 and covering the inner insulating layer 20, and an outer insulating layer 40 extending along the first direction L1 and covering the second metal covering layer 30. The wire comprises an axial end edge D. Then the procedure goes to step S2.

Figure 10:
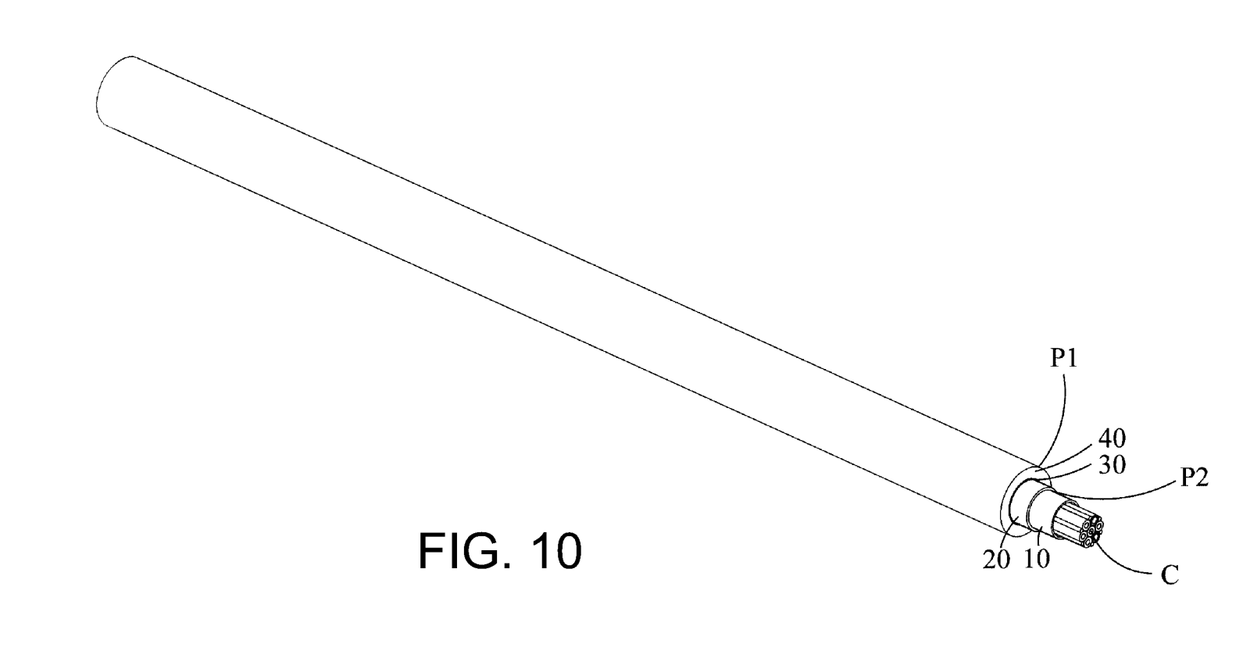
FIG. 10 is a schematic diagram of cutting an outer insulating layer and a second metal covering layer at a first position, and cutting an inner insulating layer at a second position of the cable provided by the cable manufacturing method of the second embodiment of the present disclosure.

FIG. 10 is a schematic diagram of cutting an outer insulating layer and a second metal covering layer at a first position and cutting an inner insulating layer at a second position of the cable provided by the cable manufacturing method of the second embodiment of the present disclosure. Referring to FIG. 1, step S2 performs cutting off the outer insulating layer 40 and the second metal covering layer 30 at a first position P1 at a first distance from the axial end edge D and peeling off the cut-off outer insulating layer 40 and the second metal covering layer 30. When the outer insulating layer 40 and the second metal covering layer 30 are cut off, the inner insulating layer 20 is also cut off at the second position P2 and then peeled off. The second position P2 is between the first position P1 and the axial end edge D. Then the procedure goes to step S3.

Figure 11:
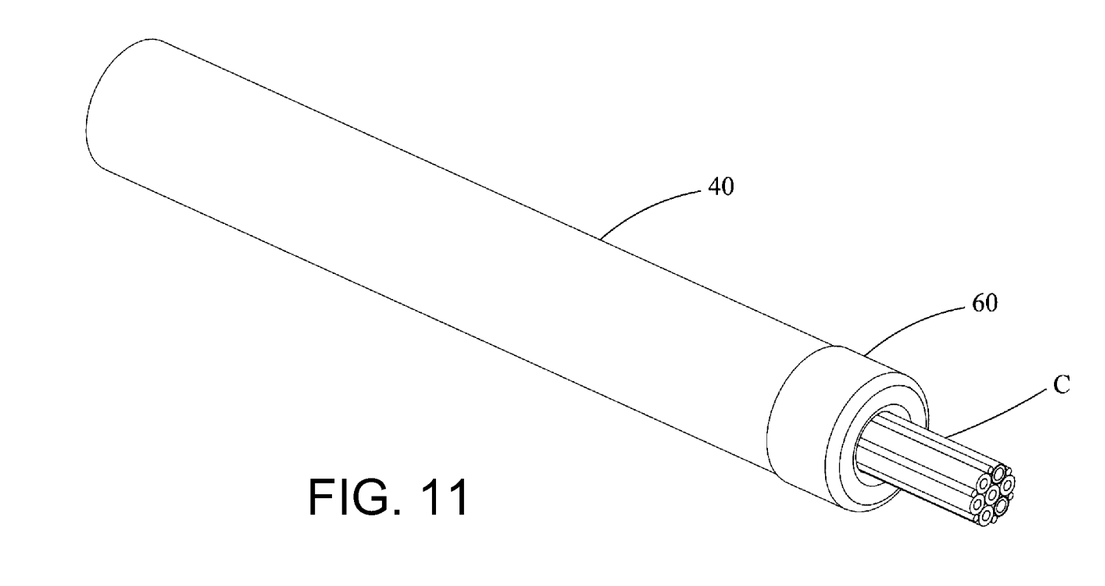
FIG. 11 is a schematic diagram of the first metal layer being back folded to form an outer metal layer in the cable manufacturing method of the second embodiment of the present disclosure.

FIG. 11 is a schematic diagram of the first metal layer being back folded to form an outer metal layer in the cable manufacturing method of the second embodiment of the present disclosure. Referring to FIG. 1, in step S3, the first metal covering layer 10 is folded in the radial direction and then in the first direction L1 to form the outer metal layer 60. The first metal covering layer 10 is folded back so that the inner insulating layer 20 is folded radially to form an insulating protective layer 50. The insulating protective layer 50 covers the third axial end part 31 of the second metal covering layer 30 and the fourth axial end part 41 of the outer insulating layer 40 and covers a part of the outer insulating layer 40 close to the fourth axial end part 41. The outer metal layer 60 covers a part of the outer surface of the insulating protective layer 50 and a part of the outer surface of the outer insulating layer 40.

Figure 12:
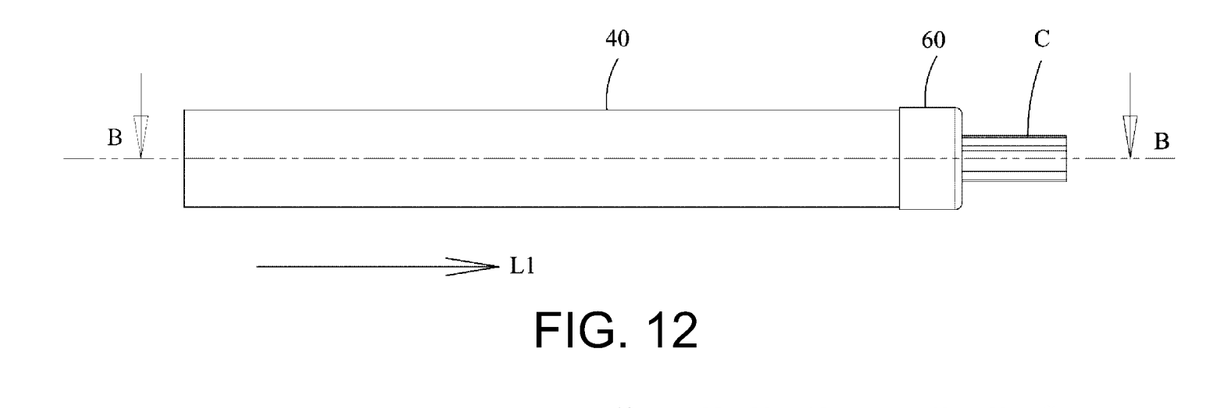
FIG. 12 is a side view of a cable assembly manufactured by the cable manufacturing method of shown in FIG. 9 to FIG. 11.
Figure 13:
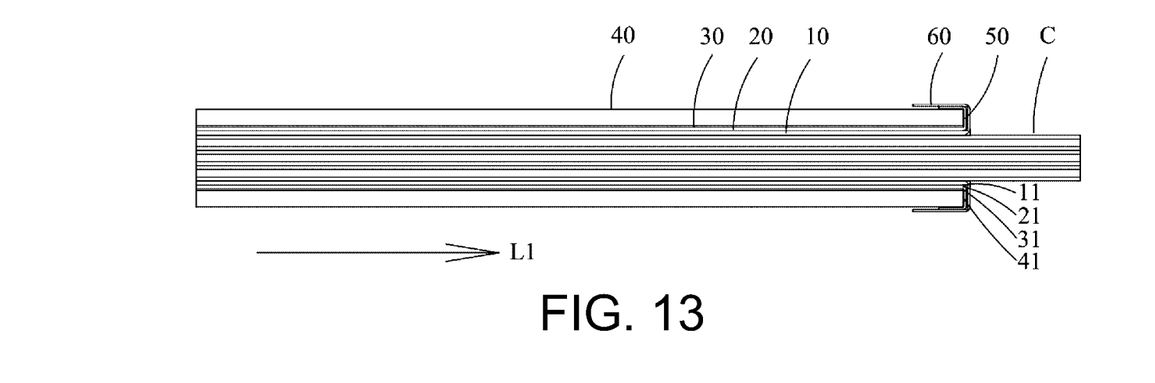
FIG. 13 is a cross-sectional view along line B-B of the cable assembly of FIG. 12.

FIG. 12 is a side view of a cable assembly manufactured by the cable manufacturing method shown in FIG. 9 to FIG. 11. FIG. 13 is a cross-sectional view along line B-B of the cable assembly of FIG. 12. This embodiment provides a partly same configuration as the first embodiment, the same components would be given the same symbols, and thus the related descriptions are omitted. The difference between this embodiment and the first embodiment is that in this embodiment the inner insulating layer 20 is directly folded in the radial direction to form an insulating protective layer 50. Thus, the inner insulating layer 20 and the insulating protective layer 50 are integrally formed. The outer metal layer 60 and the first metal covering layer 10 are also integrally formed.

In another embodiment, after step S3 of the first embodiment, a metal ring is sleeved to the outer periphery of the wire and to the outer periphery of the first metal covering layer and adheres to the insulating protective layer. The metal ring can be configured to only cover the insulating protective layer, or cover the outer peripheral surface of the insulating protective layer and the outer peripheral surface of the outer insulating layer. For example, the metal ring can be sleeved to the periphery of the first metal covering layer and to contact with the outer peripheral surface of the first metal covering layer, and to contact with the radial surface of the insulating protective layer, thereby forming the outer metal layer. Besides, the metal ring can also be cap-shaped, which covers the radial surface of the insulating protective layer, and also covers the outer peripheral surface of the insulating protective layer and the outer peripheral surface of the outer insulating layer.

In summary, embodiments of the present disclosure provide a cable assembly and cable manufacturing method. By providing an insulating protective layer at the axial end part at the cut-off of the first position of the second metal covering layer, the insulating protective layer would prevent the outer metal layer from being contacting with the second metal covering layer when the outer metal layer extends radially from the first metal covering layer. Thus, the outer metal layer and the second metal covering layer can be prevented from forming a short circuit, which affects the electromagnetic compatibility of the cable.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A cable assembly, comprising:
   a transmission wire extending along a first direction;
   a first metal covering layer extending along the first direction and covering the transmission wire, the first metal covering layer comprising a first axial end part;
   an inner insulating layer extending along the first direction and covering the first metal covering layer, the inner insulating layer comprising a second axial end part;
   a second metal covering layer extending along the first direction and covering the inner insulating layer, the second metal covering layer comprising a third axial end part;
   an outer insulating layer extending along the first direction and covering the second metal covering layer, the outer insulating layer comprising a fourth axial end part;
   an insulating protective layer covering the third axial end part of the second metal covering layer; and
   an outer metal layer extending radially from the first axial end part of the first metal covering layer to cover the insulating protective layer.

2. The cable assembly according to claim 1, wherein the insulating protective layer is formed on the third axial end part of the second metal covering layer by coating or glue dispensing.

3. The cable assembly according to claim 2, wherein the insulating protective layer covers the second axial end part of the inner insulating layer and the fourth axial end part of the outer insulating layer.

4. The cable assembly according to claim 2, wherein the second axial end part of the inner insulating layer, the third axial end part of the second metal covering layer, and the fourth axial end part of the outer insulating layer are aligned and flushed in the first direction.

5. The cable assembly according to claim 4, wherein the first metal covering layer is exposed from the inner insulating layer, the second metal covering layer, and the outer insulating layer; the first axial end part is distant from the second axial end part, the third axial end part, and the fourth axial end part.

6. The cable assembly according to claim 1, wherein the insulating protective layer covers the second axial end part of the inner insulating layer and the fourth axial end part of the outer insulating layer.

7. The cable assembly according to claim 1, wherein the second axial end part of the inner insulating layer, the third axial end part of the second metal covering layer, and the fourth axial end part of the outer insulating layer are aligned and flushed in the first direction.

8. The cable assembly according to claim 7, wherein the first metal covering layer is exposed from the inner insulating layer, the second metal covering layer, and the outer insulating layer; the first axial end part is distant from the second axial end part, the third axial end part, and the fourth axial end part.

9. The cable assembly according to claim 1, wherein the insulating protective layer and the inner insulating layer are integrally formed; the insulating protective layer radially extends from the second axial end part of the inner insulating layer.

10. The cable assembly according to claim 1, wherein the outer metal layer and the first metal covering layer are integrally formed; the outer metal layer is formed by folding the first metal covering layer from the first axial end part in a radial direction.

11. The cable assembly according to claim 1, wherein the outer metal layer extends along the first direction to at least cover a part of the outer insulating layer close to the fourth axial end part.

12. A cable manufacturing method, comprising:
   providing a wire, the wire comprising a transmission wire extending along a first direction, a first metal covering layer extending along the first direction and covering the transmission wire, an inner insulating layer extending along the first direction and covering the first metal covering layer, a second metal covering layer extending along the first direction and covering the inner insulating layer, and an outer insulating layer extending along the first direction and covering the second metal covering layer, the wire comprising an axial end edge;
   cutting off the outer insulating layer and the second metal covering layer at a first position at a first distance from the axial end edge, peeling off the cut-off outer insulating layer and the second metal covering layer;

disposing an insulating protective layer at an axial end part of the cut-off position of the first position of the second metal covering layer, covering the axial end part of the second metal covering layer with the insulating protective layer;

forming an outer metal layer, the outer metal layer extending radially from the first metal covering layer to cover the insulating protective layer.

13. The cable manufacturing method according to claim 12 comprising:

cutting the inner insulating layer at the first position, and peeling off the cut-off inner insulating layer.

14. The cable manufacturing method according to claim 13, wherein the disposing of the insulating protective layer comprising:

forming the insulating protective layer on the axial end part of the second metal covering layer by coating or glue dispensing.

15. The cable manufacturing method according to claim 14, wherein the insulating protective layer further covers an axial end part of the inner insulating layer and an axial end part of the outer insulating layer.

16. The cable manufacturing method according to claim 13, wherein the insulating protective layer further covers an axial end part of the inner insulating layer and an axial end part of the outer insulating layer.

17. The cable manufacturing method according to claim 16, wherein the axial end part of the inner insulating layer, the axial end part of the second metal covering layer, and the axial end part of the outer insulating layer are aligned and flushed in the first direction.

18. The cable manufacturing method according to claim 17, wherein the first metal covering layer is exposed from the inner insulating layer, the second metal covering layer, and the outer insulating layer; an axial end part of the first metal covering layer is distant from the axial end part of the inner insulating layer, the axial end part of the second metal covering layer, and the axial end part of the outer insulating layer.

19. The cable manufacturing method according to claim 12, wherein the disposing of the insulating protective layer comprising:

cutting off the inner insulating layer at a second position, having the inner insulating layer folded radially to form the insulating protective layer; wherein the second position is between the first position and the axial end edge.

20. The cable manufacturing method according to claim 12, wherein the forming of the outer metal layer comprising:

folding the first metal covering layer in a radial direction and then in the first direction to form the outer metal layer.

* * * * *